United States Patent
Kim et al.

(10) Patent No.: US 8,008,415 B2
(45) Date of Patent: Aug. 30, 2011

(54) PHOTOREACTIVE EXO-RICH NORBORNENE POLYMER AND METHOD FOR PREPARING THE SAME

(75) Inventors: Heon Kim, Daejeon (KR); Sung-Ho Chun, Daejeon (KR); Hye-Young Jung, Daejeon (KR); Dai-Seung Choi, Daejeon (KR); Kyoung-Hoon Kim, Daejeon (KR); Jong-Chan Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 17 days.

(21) Appl. No.: 12/450,303

(22) PCT Filed: Mar. 21, 2008

(86) PCT No.: PCT/KR2008/001625
§ 371 (c)(1),
(2), (4) Date: Sep. 21, 2009

(87) PCT Pub. No.: WO2008/115035
PCT Pub. Date: Sep. 25, 2008

(65) Prior Publication Data
US 2010/0121005 A1    May 13, 2010

(30) Foreign Application Priority Data
Mar. 22, 2007  (KR) .................. 10-2007-0028091

(51) Int. Cl.
*C08F 36/20* (2006.01)
*C08F 4/80* (2006.01)
*C09K 19/00* (2006.01)

(52) U.S. Cl. ........ 526/282; 526/134; 526/145; 526/172; 526/239; 526/274; 526/279; 526/256; 526/262; 526/263; 526/266

(58) Field of Classification Search .......... 526/172, 526/256, 262, 266, 282, 134, 145, 239, 263, 526/274, 279
See application file for complete search history.

(56) References Cited

U.S. PATENT DOCUMENTS

| | | | |
|---|---|---|---|
| 5,464,669 A | 11/1995 | Kang et al. | |
| 5,498,799 A | 3/1996 | Torihara et al. | |
| 6,875,555 B1 * | 4/2005 | Feiring et al. | 430/270.1 |
| 2005/0010006 A1 * | 1/2005 | Chun et al. | 526/171 |
| 2006/0115448 A1 | 6/2006 | Tew et al. | |
| 2006/0160970 A1 | 7/2006 | Kim et al. | |

FOREIGN PATENT DOCUMENTS

| | | |
|---|---|---|
| EP | 1 415 974 | 5/2004 |
| EP | 1 453 350 | 7/2004 |
| EP | 1 623 967 | 2/2006 |
| JP | 11-181127 | 7/1999 |
| KR | 10-2004-0005593 | 1/2004 |

OTHER PUBLICATIONS

Schadt et al., "Surface-Induced Parallel Alignment of Liquid Crystals by Linearly Polymerized Photopolymers", Jpn. J. Appl. Phys., vol. 31, 1992, pp. 2155-2164.

Dyaduysha et al., "Peculiarity of an Oblique Liquid Crystal Alignment Induced by a Photosensitive Orientant", Jpn. J. Appl. Phys., vol. 34, 1995, pp. L 1000-L 1002.

\* cited by examiner

*Primary Examiner* — Fred M Teskin
(74) *Attorney, Agent, or Firm* — McKenna Long & Aldridge LLP (57) ABSTRACT

The present invention relates to a norbornene polymer that comprises a norbornene monomer having a photoreactive functional group, and a method of manufacturing the same. The norbornene polymer comprises at least 50 mol % of exo isomers among the norbornene monomers having the photoreactive functional group. Since the norbornene polymer according to the present invention comprises at least 50 mol % of exo isomers among the norbornene monomers having the photoreactive functional group, a molecular weight is significantly increased while the yield is not reduced during the manufacturing of the polymer. In views of the three dimensional structure, stability is ensured because the polymer has a planar structure in which the photoreactive groups between the molecules are close to each other. Therefore, the distance between the photoreactive groups is reduced, thus increasing the photoreaction rate.

9 Claims, 2 Drawing Sheets

| Norbornene | U-U | U-D | D-D | D-U |
|---|---|---|---|---|
| | Helix | Helix | Helix | Helix |
| Kcal/mol | -94.47122 | -197.34817 | -62.97597 | -191.8558 |

[Fig. 4]

| Cinnamate Norbornene | U-U | U-D | D-D | D-U |
|---|---|---|---|---|
| | Planar | Helix | Planar | Helix |
| Exo (kcal/mol) | -10707 | -8217 | -10848 | -8028 |
| Endo (kcal/mol) | -10415 | -8160 | -10140 | -7281 |

PHOTOREACTIVE EXO-RICH NORBORNENE POLYMER AND METHOD FOR PREPARING THE SAME

This application claims the benefit of PCT/KR2008/001625 filed on Mar. 21, 2008 and Korean Patent Application No. 10-2007-0028091 filed on Mar. 22, 2007, both of which are hereby incorporated herein by reference for all purposes in their entirety.

TECHNICAL FIELD

The present invention relates to a norbornene polymer that includes at least 50 mol % of exo isomers among norbornene monomers having a photoreactive group, and a method of manufacturing the same. This application claims priority from Korea Patent Application No. 10-2007-0028091 filed on Mar. 22, 2007 in the KIPO, the disclosure of which is incorporated herein by reference in its entirety.

BACKGROUND ART

In recent years, a liquid crystal display has become bigger and has been used for home wall-mounted televisions as well as personal notebook computers, accordingly, it is required to ensure the high definition, the high quality, and the wide viewing angle in respects to the liquid crystal display. In particular, since a thin film transistor liquid crystal display (TFT-LCD) that is driven by using a thin film transistor independently drives each of pixels, a response rate of the liquid crystal is very high, thus, a high-quality dynamic image can be realized. Accordingly, currently, the application range thereof is expanded.

In the TFT-LCD, in order to use the liquid crystal as an optical switch, it is required that the liquid crystal is initially aligned on the layer on which the thin film transistor is formed at the innermost part of the display cell in a predetermined direction. In order to achieve this, a liquid crystal alignment film is used.

With respect to a liquid crystal display, currently, a process of aligning a liquid crystal includes applying a heat resistant polymer film such as polyimide on a transparent glass to form a polymer alignment film and rubbing the alignment film while a rotation roller that is wound by a rubbing cloth made of nylon, rayon or the like is rotated at a high rate to achieve the alignment. This process is called a rubbing process.

However, since the rubbing process may cause mechanical scratches or the high static electricity on the surface of the liquid crystal alignment material during the rubbing process, a thin film transistor is destroyed and inferiority occurs due to fine fibers generated from the rubbing cloth, thus preventing the production yield from being improved. In order to avoid the problem of the rubbing process to improve the productivity, a novel liquid crystal alignment process is designed, which is a liquid crystal alignment by using UV, that is, light (hereinafter, referred to as "optical alignment").

The optical alignment is a mechanism in which a photoreaction of a photosensitive group that is connected to the polymer occurs due to linearly polarized ultraviolet rays, and in this procedure, a main chain of the polymer is unidirectionally aligned, thereby forming a photopolymerizable liquid crystal alignment film in which the liquid crystals are aligned.

A representative example of the optical alignment is an optical alignment using photopolymerization that is announced by M. Schadt, et al. (Jpn. J. Appl. Phys., Vol 31, 1992, 2155), Dae S. Kang, et al. (U.S. Pat. No. 5,464,669), and Yuriy Reznikov (Jpn. J. Appl. Phys. Vol. 34, 1995, L1000).

The polycinnamate-based polymer such as PVCN (poly (vinyl cinnamate)) and PVMC (poly(vinyl methoxycinnamate)) has been mainly used as the optical alignment polymer that is disclosed in the known patent documents and papers. In the case of when the polycinnamate-based polymer is subjected to the optical alignment, the double bond [2+2] of cinnamate is subjected to the [2+2] cycloaddition reaction by using radiated UV to form cyclobutane, thus, an anisotropic property is formed to unidirectionally align liquid crystal molecules, which causes the alignment of the liquid crystals.

In the related art, in respects to the optical alignment polymer, Japanese Unexamined Patent Application Publication No. 11-181127 discloses a method of producing a polymer type of alignment film that has a main chain such as acrylate and methacrylate and a side chain having a photosensitive group such as a cinnamate group, and an alignment film that is produced by using the method. However, the patent is disadvantageous in that since the mobility of the polymer is poor, even though the polymer is exposed to light for a long time, it is difficult to obtain the desired alignment property. The reason for this is that since the photosensitive group which is present in the polymer is restricted by the main chain of the polymer, the group is difficult to rapidly react with the radiated polarized light. Accordingly, since a long time is required to obtain a network polymer, a process efficiency is reduced, and if an alignment treatment process is finished after an insufficient time, since the alignment of the liquid crystals is insufficient in the manufactured liquid crystal display, there are problems in that a dichroic ratio is low and contrast is reduced.

DISCLOSURE

Technical Problem

Accordingly, the present invention has been made keeping in mind the above problems occurring in the related art, and an object of the present invention is to provide a polymer having advantages in that a molecular weight is significantly increased while the yield is not reduced during the manufacturing of the polymer, and since a three dimensional structure of the polymer is planar, when inter chain cross-linking photoreaction occurs, the double bonds of the photoreactive groups become close to each other, [2+2] cycloadditional reaction yield and rate are increased, and the induced anisotropic property is maximized.

Technical Solution

In order to accomplish the above object, the present invention provides a norbornene polymer that includes norbornene monomers having a photoreactive functional group and at least 50 mol % of exo isomers among the norbornene monomers having the photoreactive functional group.

In addition, the present invention provides a method of manufacturing a photoreactive norbornene monomers including at least 50 mol % of exo isomers. In the method, dicyclopentadiene and an ester compound are subjected to a Diels-Alder reaction at a temperature in the range of 180 to 260° C. for 1 to 10 hours to obtain a norbornene-ester monomer including 50 mol % or more exo isomers and the photoreactive group is introduced to the ester group by using a substitution or addition reaction.

In addition, the present invention provides a method of manufacturing a norbornene polymer that includes at least 50 mol % of exo isomers among the norbornene monomers having the photoreactive functional group. The method includes polymerizing photoreactive norbornene monomers having at least 50 mol % of exo isomers at a temperature in the range of 10 to 200° C. in the presence of a catalyst mixture of a procatalyst that includes a Group 10 transition metal and a cocatalyst that is capable of being weakly coordinate bonded to the metal of the procatalyst.

Advantageous Effects

An exo-rich norbornene polymer according to the present invention, which includes at least 50 mol % of exo isomers among norbornene monomers having photoreactive functional groups is excellent in terms of thermal stability because norbornene constitutes a main chain. In addition, since a three dimensional structure of the polymer is planar, the photoreactive groups are disposed close to each other, and inter chain cross-linking photoreaction easily occurs. Thus, the photoreaction rate is increased and the anisotropic property is maximized.

BEST MODE

Hereinafter, the present invention will be described in detail.

In the present invention, a reaction temperature and a reaction time of a Diels-Alder reaction are controlled to produce a norbornene monomer mixture in which the amount of a norbornene-ester monomer of an exo isomer is at least 50 mol % or more and which has the same polar functional group as norbornene-ester.

When reaction energies of the endo isomer having a polar functional group of an ester group and the exo isomer are compared to each other in the Diels-Alder reaction, in views of reaction kinetics, since the transition state of the endo isomer is stable, the endo isomer is competitive in respects to the production of the Diels-Alder reaction. Thus, the endo isomer can be easily produced. In views of thermodynamics, since the reaction product of the exo isomer is stable, the exo isomer is competitive in respects to the production of the Diels-Alder reaction. Hence, in the case where the reaction time and the reaction temperature are controlled, the mixture of monomers that consist mostly of the exo isomers can be synthesized.

The functional groups of the norbornene-ester monomer that includes 50 mol % or more exo isomers generated as described above may be changed by using a substitution or additional reaction to perform synthesis. If the photoreactive group such as cinnamate is introduced thereto, the exo-rich photoreactive norbornene monomer is synthesized.

In addition, the present invention may provide an exo-rich photoreactive norbornene polymer that includes the above monomer as a repeating unit.

In general, it is known that if the polymer is manufactured by using the norbornene monomer having the polar functional group, in the case of when the monomer is the endo isomer, the polymerization rate is relatively slow and the polymer has the low molecular weight as compared to the case of when the monomer is the exo isomer, thus reducing the degree of polymerization.

Therefore, the photoreactive norbornene polymer according to the present invention is manufactured by using the monomer that includes at least 50 mol % exo isomers, a molecular weight is significantly increased while the yield is not reduced, and since norbornene constitutes a main chain, a glass transition temperature is increased to improve the thermal stability.

In addition, there are advantages in that since a three dimensional structure of the polymer is planar, when inter chain cross-linking photoreaction occurs, the double bonds of the photoreactive groups become close to each other, [2+2] cycloadditional reaction yield and rate are increased, and the induced anisotropic property is maximized.

Figure 1:
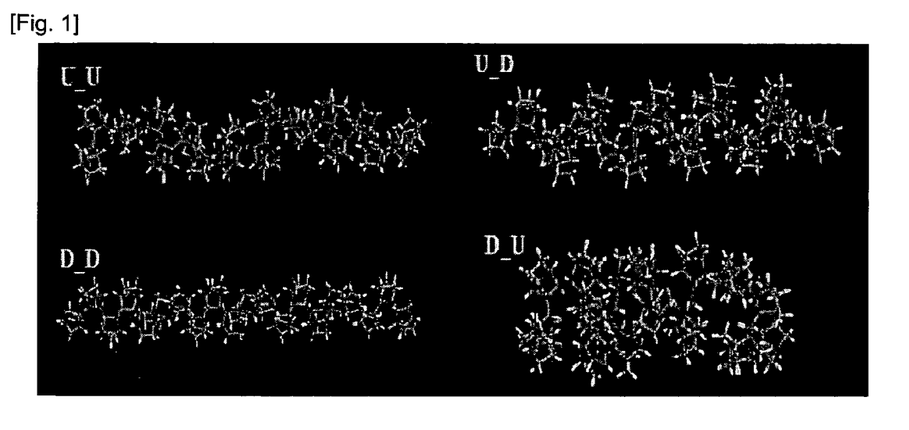
FIG. 1 illustrates a three dimensional structure of a pure norbornene polymer having no substituent.
Figure 2:
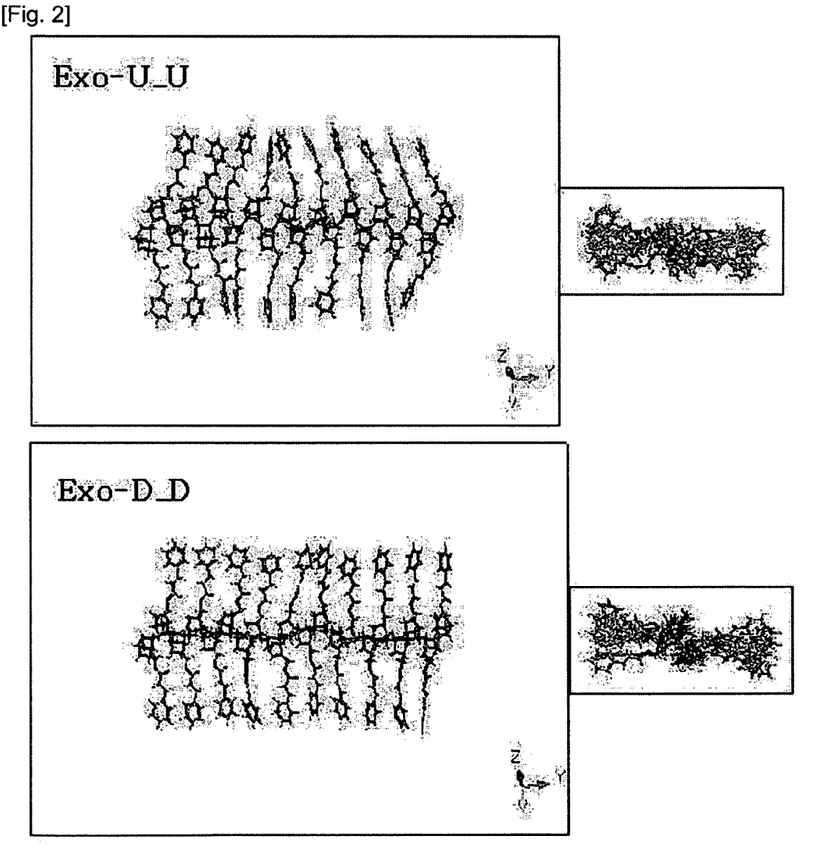
FIG. 2 illustrates three dimensional structures according to isomers of a norbornene polymer having a photoreactive functional group.
Figure 3:
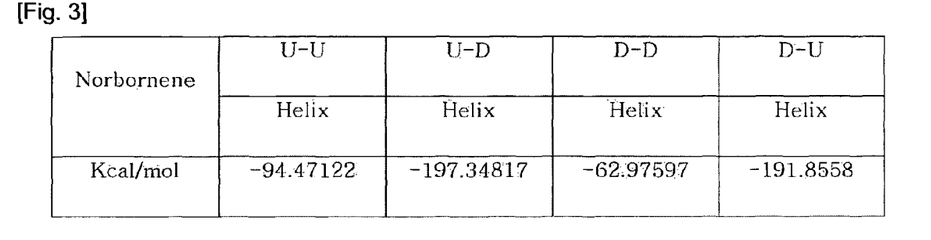
FIG. 3 is a table that illustrates energy values of three dimensional structures according to the tacticity of the pure norbornene polymer having no substituent.
Figure 4:
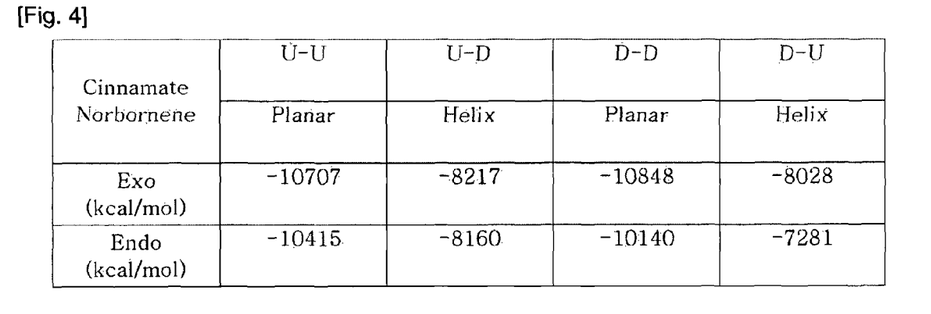
FIG. 4 is a table that illustrates energy values of three dimensional structures according to the tacticity of the norbornene polymer having the photoreactive functional group.

FIGS. 1 to 4 illustrate structures of polymer chains consisting of 200 monomers taken using a molecular mechanics process. The Discover program manufactured by Accelrys, Co., Ltd. was used and COMPASS was used as a force field. In addition, the structural optimization was performed by using the Conjugate Gradient method. FIGS. 1 and 3 illustrate a difference in energy according to the three dimensional structure and the tacticity of the norbornene polymer having no functional group. FIGS. 2 and 4 illustrate a difference in energy according to the three dimensional structure, the tacticity, and the exo and endo isomers of the polymer that is polymerized in the following Example 2 and subjected to the molecular mechanics process.

With reference to FIGS. 1 and 2, in views of the three dimensional structure of the norbornene polymer having the photoreactive functional group according to the present invention, the norbornene polymer having no functional group does not have the planar structure due to the steric hindrance between norbornene molecules but the helix structure regardless of the tacticity of the main chain.

On the other hand, the polymer in which the photoreactive functional group side chains are bonded has a planar structure regardless of the tacticity of the main chain. The reason why the polymer has the planar structure is that even though there is the steric hindrance of the main chain, due to the interaction between the photoreactive functional groups, that is, the π-π stacking between the phenyl rings, the stabilization is increased.

In particular, from Table of FIG. 4, it can be seen that in the case of when the polymer includes only the exo isomers, the stability is higher by about 300~700 kcal/mol when the polymer has the planar structure, in comparison with the case of when the polymer includes only the endo isomers.

Accordingly, in the case of when the photoreactive norbornene polymer include the exo isomers according to the present invention in an excessive amount, the planar structure becomes more stable, the double bonds become closer during the reaction in which the cyclobutane ring is generated through the [2+2] cycloaddition reaction by using UV. Thus, an anisotropic generation rate is increased, which improves the effect of the optical alignment.

The exo isomer-rich norbornene monomer that includes the photoreactive functional group according to the present invention may be a compound that is represented by the following Formula 1.

[Formula 1]

In Formula 1, p is an integer in the range of 0 to 4, at least one of $R_1$, $R_2$, $R_3$, and $R_4$ is a radical that is selected from the group consisting of the following Formulae 1a, 1b, 1c, 1d and 1e and the remains are each independently selected from the group consisting of hydrogen; halogen; substituted or unsubstituted C1-20 alkyl; substituted or unsubstituted C2-20 alkenyl; substituted or unsubstituted C5-12 cycloalkyl; substituted or unsubstituted C6-40 aryl; substituted or unsubstituted C7-15 aralkyl; substituted or unsubstituted C2-20 alkynyl; and a non-hydrocarbonaceous polar group that includes one or more elements selected from the group consisting of oxygen, nitrogen, phosphorus, sulfur, silicon, and boron, if $R_1$, $R_2$, $R_3$, and $R_4$ are not hydrogen, halogen, or a polar functional group, $R_1$ and $R_2$, or $R_3$ and $R_4$ may be bonded to each other to form a C1-10 alkylidene group, or $R_1$ or $R_2$ may be bonded to any one of $R_3$ and $R_4$ to form a saturated or unsaturated C4-12 ring or an aromatic ring having 6 to 24 carbon atoms, specific examples of the non-hydrocarbonaceous polar group include, but are not limited to:

—$OR_6$, —$R_5O_6$, —$OC(O)OR_6$, —$R_5OC(O)OR_6$, —$C(O)OR_6$, —$R_5C(O)OR_6$, —$C(O)R_6$, —$R_5C(O)R_6$, —$OC(O)R_6$, —$R_5OC(O)R_6$, —$(R_5O)_p$—$OR_6$ (p is an integer in the range of 1 to 10), —$(OR_5)_p$—$OR_6$ (p is an integer in the range of 1 to 10), —$C(O)$—$O$—$C(O)R_6$, —$R_5C(O)$—$O$—$C(O)R_6$, —$SR_6$, —$R_5SR_6$, —$SSR_6$, —$R_5SSR_6$, —$S(=O)R_6$, —$R_5S(=O)R_6$, —$R_5C(=S)R_6$, —$R_5C(=S)SR_6$, —$R_5SO_3R_6$, —$SO_3R_6$, —$R_5N=C=S$, —$N=C=S$, —$NCO$, —$R_5$—$NCO$, —$CN$, —$R_5CN$, —$NNC(=S)R_6$, —$R_5NNC(=S)R_6$, —$NO_2$, —$R_5NO_2$, R₅ of each of the functional groups is substituted or unsubstituted C1-20 alkylene; substituted or unsubstituted C2-20 alkenylene; substituted or unsubstituted C5-12 cycloalkylene; substituted or unsubstituted C6-40 arylene; substituted or unsubstituted C7-15 aralkylene; or substituted or unsubstituted C2-20 alkynylene, R₆, R₇ and R₈ are each independently hydrogen; halogen; substituted or unsubstituted C1-20 alkyl; substituted or unsubstituted C2-20 alkenyl; substituted or unsubstituted C5-12 cycloalkyl; substituted or unsubstituted C6-40 aryl; substituted or unsubstituted C7-15 aralkyl; or substituted or unsubstituted C2-20 alkynyl, in Formulae 1a, 1b, 1c, 1d and 1e, A and A' are substituted or unsubstituted C1-20 alkylene, carbonyl, carboxy, substituted or unsubstituted C6-40 arylene, substituted or unsubstituted C6-40 heteroarylene, or a simple bond;

B is oxygen, sulfur, —NH—, or a simple bond;

X is oxygen or sulfur;

R₉ is a simple bond, substituted or unsubstituted C1-20 alkylene; substituted or unsubstituted C2-20 alkenylene; substituted or unsubstituted C5-12 cycloalkylene; substituted or unsubstituted C6-40 arylene; substituted or unsubstituted C7-15 aralkylene; or substituted or unsubstituted C2-20 alkynylene;

in Formula 1a,

R₁₀ is C6-40 aryl; or C6-40 hetero aryl that includes Group 14, 15 or 16 hetero elements (S, O, N or the like), and aryl or hetero aryl is substituted with substituted or unsubstituted C1-20 alkoxy or substituted or unsubstituted C6-30 aryloxy;

in Formulae 1b and 1c,

R₁₀, R₁₁, R₁₂, and R₁₃ are each independently selected from the group consisting of substituted or unsubstituted C1-20 alkyl; substituted or unsubstituted C1-20 alkoxy; substituted or unsubstituted C6-30 aryloxy; substituted or unsubstituted C6-40 aryl; C6-40 hetero aryl that includes Group 14, 15 or 16 hetero elements (S, O, N or the like); and substituted or unsubstituted C6-40 alkoxyaryl, R₁₄ is C6-40 aryl; or C6-40 hetero aryl that includes Group 14, 15 or 16 hetero elements (S, O, N or the like), and the aryl or hetero aryl is substituted with substituted or unsubstituted C1-20 alkoxy or substituted or unsubstituted C6-30 aryloxy;

in Formula 1d,

R₁₀ and R₁₄ are each independently are selected from the group consisting of substituted or unsubstituted C1-20 alkyl;

substituted or unsubstituted C1-20 alkoxy; substituted or unsubstituted C6-30 aryloxy; substituted or unsubstituted C6-40 aryl; C6-40 hetero aryl that includes Group 14, 15 or 16 hetero elements (S, O, N or the like); and substituted or unsubstituted C6-40 alkoxyaryl, at least one of $R_{11}$, $R_{12}$, and $R_{13}$ is C6-40 aryl; or C6-40 hetero aryl that includes Group 14, 15 or 16 hetero elements (S, O, N or the like), and the aryl or hetero aryl is substituted with substituted or unsubstituted C1-20 alkoxy or substituted or unsubstituted C6-30 aryloxy;

in Formula 1e, at least one of $R_{10}$ and $R_{11}$ is C6-40 aryl; or C6-40 hetero aryl that includes Group 14, 15 or 16 hetero elements (S, O, N or the like), and the aryl or hetero aryl is substituted with substituted or unsubstituted C1-20 alkoxy or substituted or unsubstituted C6-30 aryloxy; and the remains are selected from the group consisting of hydrogen, substituted or unsubstituted C1-20 alkyl; substituted or unsubstituted C1-20 alkoxy; substituted or unsubstituted C6-30 aryloxy; and substituted or unsubstituted C6-40 alkoxyaryl.

In addition, in the substituent groups, examples of C6-40 aryl and C6-40 hetero aryl that includes Group 14, 15 or 16 hetero elements (S, O, N or the like) include, but are not limited to compounds that are represented by the following Formula 2.

[Formula 2]

in the above Formulae, at least one of $R'_{10}$, $R'_{11}$, $R'_{12}$, $R'_{13}$, $R'_{14}$, $R'_{15}$, $R'_{16}$, $R'_{17}$, and $R'_{18}$ is necessarily substituted or unsubstituted C1-20 alkoxy or substituted or unsubstituted C6-30 aryloxy, and the remains are each independently selected from the group consisting of hydrogen, substituted or unsubstituted C1-20 alkyl, substituted or unsubstituted C1-20 alkoxy, substituted or unsubstituted C6-30 aryloxy, and substituted or unsubstituted C6-40 aryl.

In the present invention, an experiment in which a polarizer is disposed before a UV lamp to directly radiate the polarized UV to the alignment film is performed. In respects to the spectrum of the polarized UV, the intensity of light is significantly reduced at 300 nm or less, and the peak at around 365 nm is highest among the peaks that are most close to ultraviolet rays. Meanwhile, the UV absorption of the radicals that are represented by Formulae 1a to 1e and include aryl or heteroaryl substituted with the alkoxy group or the aryloxy group is red-shifted as compared to the radicals that include aryl substituted with the hydrogen or the alkyl group. Accordingly, it is expected that the photoreaction rapidly occurs in the case of the radicals having the absorption spectrum that is close to the highest peak of UV in comparison with the cases of the other radicals.

In addition, the radicals that include aryl or heteroaryl substituted with the alkoxy group or the aryloxy group and are represented by Formulae 1a to 1e have increased compatibility in respects to the liquid crystals, thus directly affecting the alignment of the liquid crystals and significantly affecting the quality of the liquid crystal retardation film finally obtained.

The norbornene compound according to the present invention is a norbornene compound at least 50 mol % of exo isomers among the norbornene monomers having the photoreactive functional group.

The exo isomer-rich norbornene polymer that includes the photoreactive functional group according to the present invention may include a repeating unit that is represented by the following Formula 3.

[Formula 3]

In Formula 3, n is in the range of 50 to 5,000, p, $R_1$, $R_2$, $R_3$, and $R_4$ are the same as those defined in Formula 1.

The exo isomer-rich norbornene polymer that includes the photoreactive functional group according to the present invention includes the photoreactive norbornene monomers having the photoreactive group as a repeating unit and provides a photoreactive norbornene polymer that includes at least 50 mol % of exo isomer norbornene monomers among the photoreactive norbornene monomers.

In addition, the photoreactive exo-rich norbornene polymer according to the present invention may further include a compound that is represented by the following Formula 4 as the repeating unit constituting the polymer.

[Formula 4]

In Formula 4, p' is an integer in the range of 0 to 4,

$R'_1$, $R'_2$, $R'_3$, and $R'_4$ are each independently selected from the group consisting of hydrogen; halogen; substituted or unsubstituted C1-20 alkyl, substituted or unsubstituted C2-20 alkenyl; substituted or unsubstituted C5-12 cycloalkyl; substituted or unsubstituted C6-40 aryl; substituted or unsubstituted C7-15 aralkyl; substituted or unsubstituted C2-20 alkynyl; and a non-hydrocarbonaceous polar group that includes one or more elements selected from the group consisting of oxygen, nitrogen, phosphorus, sulfur, silicon, and boron, if $R'_1$, $R'_2$, $R'_3$, and $R'_4$ are not hydrogen, halogen, or a polar functional group, $R'_1$ and $R'_2$ or $R'_3$ and $R'_4$ may be bonded to each other to form a C1-10 alkylidene group, or $R'_1$ or $R'_2$ may be bonded to any one of $R'_3$ and $R'_4$ to form a saturated or unsaturated C4-12 ring or an aromatic ring having 6 to 24 carbon atoms, specific examples of the non-hydrocarbonaceous polar group include, but are not limited to, —$OR_6$, —$OC(O)OR_6$, —$R_5OC(O)OR_6$, —$C(O)OR_6$, —$R_5C(O)OR_6$, —$C(O)R_6$, —$R_5C(O)R_6$, —$OC(O)R_6$, —$R_5OC(O)R_6$, —$(R_5O)_p$—$OR_6$ (p is an integer in the range of 1 to 10), —$(OR_5)_p$—$OR_6$ (p is an integer in the range of 1 to 10), —$C(O)$—$O$—$C(O)R_6$, —$R_5C(O)$—$O$—$C(O)R_6$, —$SR_6$, —$R_5SR_6$, —$SSR_6$, —$R_5SSR_6$, —$S(=O)R_6$, —$R_5S(=O)R_6$, —$R_5C(=S)R_6$, —$R_5C(=S)SR_6$, —$R_5SO_3R_6$, —$SO_3R_6$, —$R_5N=C=S$, —$N=C=S$, —$NCO$, —$R_5$—$NCO$, —$CN$, —$R_5CN$, —$NNC(=S)R_6$, —$R_5NNC(=S)R_6$, —$NO_2$, —$R_5NO_2$, $R_5$ of each of the functional groups is substituted or unsubstituted C1-20 alkylene; substituted or unsubstituted C2-20 alkenylene; substituted or unsubstituted C5-12 cycloalkylene; substituted or unsubstituted C6-40 arylene; substituted or unsubstituted C7-15 aralkylene; or substituted or unsubstituted C2-20 alkynylene, and $R_6$, $R_7$ and $R_8$ are each hydrogen; halogen; substituted or unsubstituted C1-20 alkyl; substituted or unsubstituted C2-20 alkenyl; substituted or unsubstituted C5-12 cycloalkyl; substituted or unsubstituted C6-40 aryl; substituted or unsubstituted C7-15 aralkyl; or substituted or unsubstituted C2-20 alkynyl.

In the case of when the repeating units derived from Formula 1 and Formula 4 are included in the photoreactive exo-rich norbornene polymer according to the present invention, the polymer may include 1 to 99 mol % of the repeating unit derived from Formula 1 and 1 to 99 mol % of the repeating unit derived from Formula 4. In the case of the polymer that includes the repeating units derived from Formula 1 and Formula 4, it is preferable that the degree of polymerization be in the range of 50 to 5000.

In connection with this, in the case of when the content of the repeating unit derived from the compound represented by Formula 4 is less than 1 mol %, there is a problem in that the solubility of the polymer is reduced. In the case of when the content of the repeating unit is more than 90 mol %, there is a problem in that the photoreaction rate is reduced due to the low content of the photoreactive functional.

The definition of the above-mentioned substituent groups will be described in detail.

The term "alkyl" means a straight- or branched-chained saturated monovalent hydrocarbon portion having 1 to 20 carbon atoms, preferably 1 to 10 carbon atoms, and more preferably 1 to 6 carbon atoms. The alkyl group may be arbitrarily substituted with one or more halogen substituents. Examples of the alkyl group include methyl, ethyl, propyl, 2-propyl, n-butyl, iso-butyl, tert-butyl, pentyl, hexyl, dodecyl, fluoromethyl, difluoromethyl, trifluoromethyl, chloromethyl, dichloromethyl, trichloromethyl, iodomethyl, bromomethyl and the like.

The term "alkenyl" means a straight- or branched-chained monovalent hydrocarbon portion having 2 to 20 carbon atoms, preferably 2 to 10 carbon atoms, and more preferably 2 to 6 carbon atoms having one or more carbon-carbon double bonds. The alkenyl group may be bonded through the carbon atoms having the carbon-carbon double bonds or the saturated carbon atoms. The alkenyl group may be arbitrarily substituted with one or more halogen substituents. Examples of the alkenyl group may include ethenyl, 1-propenyl, 2-propenyl, 2-butenyl, 3-butenyl, pentenyl, 5-hexenyl, dodecenyl and the like.

The term "cycloalkyl" means a saturated or unsaturated nonaromatic monovalent monocyclic, bicyclic or tricyclic hydrocarbon portion having 5 to 12 cyclic carbons, and may be arbitrarily substituted with one or more halogen substituents. Examples of the cycloalkyl may include cyclopropyl, cyclobutyl, cyclopentyl, cyclopentenyl, cyclohexyl, cyclohexenyl, cycloheptyl, cyclooctyl, decahydronaphthalenyl, adamantyl, norbornyl (that is, bicyclo [2.2.1] hept-5-enyl) or the like.

The term "aryl" means a monovalent monocyclic, bicyclic or tricyclic aromatic hydrocarbon portion having 6 to 20 ring atoms, and preferably 6 to 12 ring atoms, and may be arbitrarily substituted with one or more halogen substituents and the like. Examples of the aryl group may include phenyl, naphthalenyl, fluorenyl and the like.

The term "heteroaryl" is C6-40 aryl that includes Group 14, 15 or 16 hetero elements (S, O, N or the like). Representative examples of "aryl" and "hetero aryl" include, but are not limited to the compounds that are represented by the following Formula 2.

<Formula 2>

In Formula 2, $R'_{10}$, $R'_{11}$, $R'_{12}$, $R'_{13}$, $R'_{14}$, $R'_{15}$, $R'_{16}$, $R'_{17}$ and $R'_{18}$ are the same as those defined in the above.

The term "alkoxyaryl" means one or more hydrogen atoms of the aryl group defined as described above, which are substituted with the alkoxy group. Examples of the alkoxyaryl group may include methoxyphenyl, ethoxyphenyl, propoxyphenyl, butoxyphenyl, pentoxyphenyl, hetoxy phenyl, heptoxy phenyl, octoxyphenyl, nanoxyphenyl, methoxybiphenyl, ethoxybiphenyl, propoxybiphenyl, methoxynaphthalenyl, ethoxynaphthalenyl, propoxynaphthalenyl, methoxyanthracenyl, ethoxyanthracenyl, propoxyanthracenyl, methoxyfluorenyl and the like.

The term "aralkyl" means one or more hydrogen atoms of the alkyl group defined as described above, which are substituted with the aryl group. The aralkyl may be arbitrarily substituted with one or more halogen substituents. Examples of the aralkyl may include benzyl, benzhydril, tritile and the like.

The term "alkynyl" means a straight- or branched-chained monovalent hydrocarbon portion having 2 to 20 carbon atoms, preferably 2 to 10 carbon atoms, more preferably 2 to 6 carbon atoms having one or more carbon-carbon triple bonds. The alkynyl group may be bonded through the carbon atoms having the carbon-carbon triple bonds or the saturated carbon atoms. The alkynyl group may be arbitrarily substituted with one or more halogen substituents. Examples of the alkynyl group may include ethynyl, propynyl and the like.

The term "alkylene" means a straight- or branched-chained divalent saturated hydrocarbon portion having 1 to 20 carbon atoms, preferably 1 to 10 carbon atoms, more preferably 1 to 6 carbon atoms. The alkylene group may be arbitrarily substituted with one or more halogen substituents. Examples of the alkyl group may include methylene, ethylene, propylene, butylene, hexylene and the like.

The term "alkenylene" means a straight- or branched-chained divalent hydrocarbon portion having 2 to 20 carbon atoms, preferably 2 to 10 carbon atoms, more preferably 2 to 6 carbon atoms having one or more carbon-carbon double bonds. The alkenylene group may be bonded through the carbon atoms having the carbon-carbon double bonds and/or the saturated carbon atoms. The alkenylene group may be arbitrarily substituted with one or more halogen substituents.

The term "cycloalkylene" means a saturated or unsaturated nonaromatic divalent monocyclic, bicyclic or tricyclic hydrocarbon portion having 5 to 12 cyclic carbons, and may be arbitrarily substituted with one or more halogen substituents. Examples of the cycloalkylene may include cyclopropylene, cyclobutylene and the like.

The term "arylene" means a divalent monocyclic, bicyclic or tricyclic aromatic hydrocarbon portion having 6 to 20 cyclic atoms and preferably 6 to 12 cyclic atoms, and may be arbitrarily substituted with one or more halogen substituents. The aromatic portion of the aryl group includes only the carbon atoms. Examples of the arylene group may include phenylene and the like.

The term "aralkylene" means a divalent portion in which one or more hydrogen atoms of the alkyl group defined as described above are substituted with the aryl group, and may be arbitrarily substituted with one or more halogen substituents. Examples of the aralkylene may include benzylene and the like.

The term "alkynylene" means a straight- or branched-chained divalent hydrocarbon portion having 2 to 20 carbon atoms, preferably 2 to 10 carbon atoms, more preferably 2 to 6 carbon atoms having one or more carbon-carbon triple bonds. The alkynylene group may be bonded through the carbon atoms having the carbon-carbon triple bonds or the saturated carbon atoms. The alkynylene group may be arbitrarily substituted with one or more halogen substituents. Examples of the alkynylene group may include ethynylene, propynylene and the like.

The term "bond" means a bonding portion while no substituent group is inserted.

The photoreactive exo-rich norbornene polymer is manufactured at a temperature in the range of 10 to 200° C. in the presence of the catalyst mixture of the procatalyst that includes a procatalyst that comprises a Group 10 transition metal, a first cocatalyst that provides a Lewis base capable of being weakly coordinate bonded to the metal of the procatalyst, and selectively a second cocatalyst that provides a compound including a neutral Group 15 electron donating ligand.

In the case of when the reaction temperature is lower than 10° C., there is a problem in that the polymerization activity is very low. In the case of when the reaction temperature is higher than 200° C., the catalyst may be decomposed, which is undesirable.

It is preferable that the catalyst mixture includes 1 to 1000 mole of the first cocatalyst and selectively 1 to 1000 mole of the second cocatalyst based on 1 mole of the procatalyst providing a Lewis base capable of being weakly coordinate bonded to the metal of the procatalyst based on 1 mole of the procatalyst including the Group 10 transition metal. In the case of when the content of the first cocatalyst is less than 1 mole, there is a problem in that the activation of the catalyst is not obtained. In the case of when the content of the first cocatalyst is more than 1000 mole, the catalytic activity of the procatalyst is reduced, which is undesirable.

The norbornene polymer according to the present invention may be various types: the homopolymer of the exo-rich norbornene monomers having the photoreactive group, the copolymer of the exo-rich norbornene monomers having different types of photoreactive groups, or the copolymer of the exo-rich norbornene monomers having the photoreactive group and the norbornene monomers having no photoreactive group.

The exo-rich photoreactive norbornene polymer according to the present invention may be used to form the alignment film by radiating linearly polarized ultraviolet rays which are unidirectionally polarized to provide the alignment to the polymer film.

[Mode for Invention]

A better understanding of the present invention may be obtained in light of the following Examples which are set forth to illustrate, but are not to be construed to limit the present invention.

In addition, in the following Examples, all the operations in which the compounds that were sensitive to air or water were treated were performed by using the standard Schlenk technique or the dry box technique. The nuclear magnetic resonance (NMR) spectrum was obtained by using the Bruker 300 spectrometer. In connection with this, the $^1$H NMR was measured at 300 MHz and the $^{13}$C NMR was measured at 75 MHz. The molecular weight and the molecular weight distribution of the polymer were measured by using the GPC (gel permeation chromatography). In connection with this, the polystyrene sample was used as the standard sample.

Toluene was subjected to the distillation in potassium/benzophenone to be purified, and dichloromethane was subjected to the purification in $CaH_2$ by the distillation.

Example 1

Polymerization of (exo-rich)5-norbornene-2-methyl-(4-methoxy cinnamate)

(1) Synthesis of (exo-rich)5-norbornene-2-carboxylic acid methyl ester

DCPD (dicyclopentadiene, Aldrich, 256.5 ml, 1.9 mol), methyl acrylate (Aldrich, 405 ml, 4.5 mol), and hydroquinone (3.2 g, 0.03 mol) were put into the high pressure reactor having the volume of 2 L and then heated to 220° C. The agitation was performed at 300 rpm to conduct the reaction for 5 hours. When the reaction was finished, the reactant was cooled and then moved to the distillation device. The distillation was performed under reduced pressure of 1 torr by using the vacuum pump to obtain the norbornene carboxylic acid methyl ester at 50° C. (yield: 57.6%). The molar ratio (mol %) of the exo isomer and the endo isomer of the product was 58.6:41.4.

$^1$H-NMR (600 MHz, CDCl3), endo: δ 6.17 (dd, 1H), 5.86 (dd, 1H), 3.97 (t, 2H), 3.15 (b, 1H), 2.88 (m, 1H), 2.85 (b, 1H), 1.86 (m, 1H), 1.57 (m, 2H), 1.35 (m, 4H), 1.21 (m, 1H), 0.89 (t, 3H); exo: δ6.09 (m, 2H), 4.05 (t, 2H), 2.98 (b, 1H), 2.86 (b, 1H), 2.20 (m, 1H), 1.88 (m, 1H), 1.58 (m, 2H), 1.50 (d, 1H), 1.34 (m, 4H), 0.89 (t, 3H).

(2) Synthesis of (exo-rich)5-norbornene-2-methanol

Norbornene carboxylic acid methyl ester (182 g, 1.2 mol) that was synthesized in (1) and 500 ml of THF were put into the two-neck flask having the volume of 1 L, and then agitated in the ice-water bath at 0° C. Lithiumaluminum hydride (LiAlH$_4$) (Aldrich, 42 g, 1.1 mol) was dissolved in 200 ml of THF and then slowly added to the above reactant by using the additional flask. After 2 hours, the reactant was heated to normal temperature and the agitation was additionally performed for 3 hours. The solution was diluted with ethyl acetate, moved to the separatory funnel, washed by using water and NaHCO$_3$ several times, and subjected to the distillation under reduced pressure to remove the solvent. The distillation was performed under reduced pressure of 1 torr by using the vacuum pump to obtain the product at 56° C. (yield: 90%). The molar ratio (mol %) of the exo isomer and the endo isomer of the product was 58:42.

$^1$H-NMR (300 MHz, CDCl3): δ 6.17~5.91 (m, 2H), 3.71~3.19 (m, 2H), 2.91~2.75 (m, 2H), 2.38 (m, 1H), 1.83 (m, 1H), 1.60~1.12 (m, 2H), 0.52 (m, 1H)

(3) Synthesis of (exo-rich)5-norbornene-2-methyl-(4-methoxy cinnamate)

(exo-rich)5-norbornene-2-methanol (15 g, 0.121 mol) that was synthesized in (2), 4-methoxy cinnamic acid (Aldrich, 21.5 g, 0.121 mol), EDC [1-(3-dimethylaminopropyl)-3-ethylcarboimide hydrochloride] (Aldrich, 37 g, 0.194 mol), and HOBT (1-hydroxybenzotriazol hydrate) (Aldrich, 24.5 g, 0.182 mol) were put into the two-neck flask having the volume of 250 ml and then dissolved in 100 ml of DMF. After the temperature was reduced to 0° C., triethyl amine (Aldrich, 75 ml, 0.605 mol) was slowly dropped. The temperature was increased to normal temperature and maintained for 3 hours. When the reaction was finished, the extraction was performed by using a great amount of ethyl acetate. The resulting substance was washed by using a $NaHCO_3$ aqueous solution, dried by using anhydrous $MgSO_4$, and filtered to remove the solvent by using the rotary evaporator, thereby manufacturing the yellow product oil. The purification was performed by using the column chromatography (hexane:ethylacetate=10:1) to obtain 5-norbornene-2-methyl-(4-methoxy cinnamate) that was the pure product (yield: 80%). The molar ratio (mol %) of the exo isomer and the endo isomer of the product was 58:42.

$^1$H-NMR (300 MHz, $CDCl_3$): δ7.72~7.66 (dd, 1H), 7.54~7.52 (d, 2H), 6.96~6.94 (d, 2H), 6.40~6.34 (dd, 1H), 6.23~6.02 (m, 2H), 4.34~3.8 (m, 2H), 3.88 (s, 3H), 2.58~2.47 (m, 1H), 1.95~1.92 (m, 2H), 1.83 (m, 1H), 1.53-1.28 (m, 2H), 0.66 (m, 1H)

(4) Polymerization of (exo-rich)5-norbornene-2-methyl-(4-methoxy cinnamate)

20 g of (exo-rich, exo:endo=58:42) 5-norbornene-2-methyl-(4-methoxy cinnamate)(70.4 mmol) that was synthesized in (3) as the monomer and 100 ml of toluene that was purified by using the solvent were put into the schlenk flask having the volume of 250 ml. 3.16 mg of $Pd(OAc)_2$ that was dissolved in 2 ml of dichloromethane and 27 mg of tricyclohexylphosphonium tetrakis (pentafluorophenyl) borate were put into the flask as the catalyst, and the reaction was performed while the agitation was performed at 90° C. for 18 hours. After the reaction was performed for 18 hours, the reactant was added to an excessive amount of ethanol to obtain a white polymer precipitate. The polymer that was obtained by filtering the precipitate using the glass funnel was dried in a vacuum oven at 65° C. for 24 hours to obtain 18 g of the 5-norbornene-2-methyl-(4-methoxy cinnamate) polymer (Mw=369,000, PDI=3.05, and yield=90%).

Comparative Example 1

Polymerization of (endo-rich)5-norbornene-2-methyl-(4-methoxy cinnamate)

20 g of (endo-rich, exo:endo=20:80) 5-norbornene-2-methyl-(4-methoxy cinnamate) (70.4 mmol) and 100 ml of toluene that was purified by using the solvent were put into the schlenk flask having the volume of 250 ml. 3.16 mg of $Pd(OAc)_2$ that was dissolved in 2 ml of dichloromethane and 27 mg of tricyclohexylphosphonium tetrakis(pentafluorophenyl) borate were put into the flask as the catalyst, and the reaction was performed while the agitation was performed at 90° C. for 18 hours.

After the reaction was performed for 18 hours, the reactant was added to an excessive amount of ethanol to obtain a white polymer precipitate. The polymer that was obtained by filtering the precipitate using the glass funnel was dried in a vacuum oven at 65° C. for 24 hours to obtain 18 g of the 5-norbornene-2-methyl-(4-methoxy cinnamate) polymer (Mw=170,000, PDI=2.06, and yield=45%).

Example 2

(exo-rich) 5-norbornene-2-methanol (15 g, 0.121 mol) that was synthesized in (2) of Example 1, triethylamine (Aldrich, 61.2 g, 0.605 mol), and 20 ml of THF were put into the two-neck flask having the volume of 250 ml, and then agitated in the ice-water bath at 0° C. Cinnamoyl chloride (22.1 g, 0.133 mol) was dissolved in 60 ml of THF and then slowly added to the above reactant by using the additional flask. After 10 min, the reactant was heated to normal temperature and the agitation was additionally performed for 1 hour. The solution was diluted with ethyl acetate, moved to the separatory funnel, washed by using water and $NaHCO_3$ several times, and subjected to the distillation under reduced pressure to remove the solvent. The purification was performed by using the column chromatography (hexane:ethyl acetate=20:1) to obtain the product (yield: 88%). The molar ratio (mol %) of the exo isomer and the endo isomer of the product was 58:42.

$^1$H-NMR (300 MHz, CDCl3): δ7.71~7.66 (dd, 1H), 7.53~7.36 (m, 5H), 6.49~6.42 (dd, 1H), 6.17~5.98 (m, 2H), 4.10~3.76 (m, 2H), 2.94~2.75 (m, 2H), 2.45 (m, 1H), 1.91~1.83 (m, 1H), 1.48~1.16 (m, 2H), 0.59 (m, 1H)

(2) Polymerization of (exo-rich) 5-norbornene-2-methyl cinnamate 5 g of (exo-rich) 5-norbornene-2-methyl cinnamate (19.66 mmol) that was synthesized in (1) as the monomer and 5 ml of toluene that was purified by using the solvent were put into the schlenk flask having the volume of 250 ml. 0.88 mg of $Pd(OAc)_2$ that was dissolved in 1 ml of dichloromethane, 1.1 mg of tricyclohexylphosphine, and 6.3 mg of dimethylanilinium tetrakis(pentafluorophenyl) borate were put into the flask as the catalyst, and the reaction was performed while the agitation was performed at 40° C. for 18 hours. After the reaction was performed for 18 hours, the reactant was added to an excessive amount of ethanol to obtain a white polymer precipitate. The polymer that was obtained by filtering the precipitate using the glass funnel was dried in a vacuum oven at 65° C. for 24 hours to obtain 4.6 g of the 5-norbornene-2-methyl cinnamate polymer (Mw=703,000, PDI=2.0, and yield=92%).

Example 3

Polymerization of (exo-rich) 5-norbornene-2-chalcone ester (1) Synthesis of (exo-rich) 5-norbornene-2-chalcone ester The (exo-rich) norbornene acid (Aldrich, 11 g, 79.64 mmol), 2-hydroxy chalcone (16.2 g, 72.4 mmol), EDC (Aldrich, 22.2 g, 115.84 mmol), HOBT (Aldrich, 14.7 g, 108.6 mmol) were put into the two-neck flask having the volume of 250 ml, and then dissolved in 100 ml of DMF. After the temperature was reduced to 0° C., triethylamine (Aldrich, 50 ml, 362 mmol) was slowly dropped. After the temperature was increased to normal temperature and maintained overnight. When the reaction was finished, the extraction was performed by using a great amount of ethyl acetate. The resulting substance was washed by using $NaHCO_3$ and $H_2O$, dried by using anhydrous $MgSO_4$, and filtered to remove the solvent by using the rotary evaporator, thereby obtaining the product. The purification was performed by using the column chromatography (hexane:ethyl acetate=20:1) to obtain the pure product (yield: 80%).

(2) Polymerization of (exo-rich), 5-norbornene-2-chalcone ester 4.3 g (12.5 mmol) of 5-norbornene-2-chalcone ester that was synthesized in (1) as the monomer and 10 ml of toluene that was purified by using the solvent were put into the schlenk flask having the volume of 250 ml. 5.6 mg of $Pd(OAc)_2$ that was dissolved in 1 ml of dichloromethane as the catalyst, 7 mg of tricyclohexylphosphine, and 40.2 mg of dimethylanilinium tetrakis(pentafluorophenyl) borate as the cocatalyst were put into the flask, and the reaction was performed while the agitation was performed at 90° C. for 18 hours. After the reaction was performed for 18 hours, the reactant was added to an excessive amount of ethanol to obtain a white polymer precipitate. The polymer that was obtained by filtering the precipitate using the glass funnel was dried in a vacuum oven at 70° C. for 24 hours to obtain 3.7 g of the norbornene-2-chalcone ester polymer (yield: 86%).

Example 4

Polymerization of (exo-rich) 5-norbornene-2-coumarine ester (1) Synthesis of (exo-rich) 5-norbornene-2-coumarine ester The (exo-rich) norbornene acid (Aldrich, 11 g, 79.64 mmol), 7-hydroxy coumarine (11.7 g, 72.4 mmol), EDC (Aldrich, 22.2 g, 115.84 mmol), HOBT (Aldrich, 14.7 g, 108.6 mmol) were put into the two-neck flask having the volume of 250 ml, and then dissolved in 100 ml of DMF. After the temperature was reduced to 0° C., triethylamine (Aldrich, 50 ml, 362 mmol) was slowly dropped. After the temperature was increased to normal temperature and it was maintained overnight. When the reaction was finished, the extraction was performed by using a great amount of ethyl acetate. The resulting substance was washed by using $NaHCO_3$ and $H_2O$, dried by using anhydrous $MgSO_4$, and filtered to remove the solvent by using the rotary evaporator, thereby obtaining the product. The recrystallization was performed by using hexane/ethanol to obtain the pure product (yield: 70%).

(2) Polymerization of (exo-rich) 5-norbornene-2-coumarine ester 3.5 g of 5-norbornene-2-coumarine ester (12.5 mmol) that was synthesized in (1) as the monomer and 7 ml of toluene that was purified by using the solvent were put into the schlenk flask having the volume of 250 ml 5.6 mg of $Pd(OAc)_2$ that was dissolved in 1 ml of dichloromethane as the catalyst, 7 mg of tricyclohexylphosphine, and 40.2 mg of dimethylanilinium tetrakis(pentafluorophenyl) borate as the cocatalyst were put into the flask, and the reaction was performed while the agitation was performed at 90° C. for 18 hours. After the reaction was performed for 18 hours, the reactant was added to an excessive amount of ethanol to obtain a white polymer precipitate. The polymer that was obtained by filtering the precipitate using the glass funnel was dried in a vacuum oven at 70° C. for 24 hours to obtain 3.15 g of the norbornene-2-coumarine ester polymer (yield: 90%).

Example 5

Polymerization of (exo-rich)5-norbornene-2-maleimide ester (1) Synthesis of (exo-rich)5-norbornene-2-maleimide ester The norbornene acid (Aldrich, 11 g, 79.64 mmol), N-hydroxymaleimide (8.2 g, 72.4 mmol), EDC (Aldrich, 22.2 g, 115.84 mmol), HOBT (Aldrich, 14.7 g, 108.6 mmol) were put into the two-neck flask having the volume of 250 ml, and then dissolved in 100 ml of DMF. After the temperature was reduced to 0° C., triethylamine (Aldrich, 50 ml, 362 mmol) was slowly dropped. After the temperature was increased to normal temperature and it was maintained overnight. When the reaction was finished, the extraction was performed by using a great amount of ethyl acetate. The resulting substance was washed by using $NaHCO_3$ and $H_2O$, dried by using anhydrous $MgSO_4$, and filtered to remove the solvent by using the rotary evaporator, thereby obtaining the product. The recrystallization was performed by using hexane/ethanol to obtain the pure product (yield: 70%).

(2) Polymerization of (exo-rich)5-norbornene-2-maleimide ester 2.9 g of 5-norbornene-2-maleimide ester (12.5 mmol) that was synthesized in (1) as the monomer and 6 ml of toluene that was purified by using the solvent were put into the schlenk flask having the volume of 250 ml. 5 mg of $Pd(OAc)_2$ that was dissolved in 0.5 ml of dichloromethane as the catalyst, 7 mg of tricyclohexylphosphine, and 40.2 mg of dimethylanilinium tetrakis(pentafluorophenyl) borate as the cocatalyst were put into the flask, and the reaction was performed while the agitation was performed at 90° C. for 18 hours. After the reaction was performed for 18 hours, the reactant was added to an excessive amount of ethanol to obtain a white polymer precipitate. The polymer that was obtained by filtering the precipitate using the glass funnel was dried in a vacuum oven at 70° C. for 24 hours to obtain 2.7 g of the norbornene-2-maleimide ester polymer (yield: 93%).

Preparation Example 1

Preparation of the Alignment Film by Using (exo-rich)5-norbornene-2-methyl-(4-methoxy cinnamate) Polymer The (exo-rich)5-norbornene-2-methyl-(4-methoxy cinnamate) polymer that was synthesized in Example 1 was dissolved in the c-pentanone solvent in a concentration of 2% by weight, and applied on the polyethylene terephthalate substrate (commercial name: SH71, manufactured by SKC Co., Ltd. in Korea) having the thickness of 80 micron by using the roll coating process so that the thickness of the polyethylene terephthalate substrate was 1000 Å after the drying. Next, the substrate was heated in an oven at 80° C. for 3 min to remove the solvent in the inside of the coating film and to form the coating film.

The exposing was performed by using a high pressure mercury lamp having the intensity of 200 $mW/cm^2$ as a light source while polarized UV that was perpendicular to the proceeding direction of the film was radiated on the coating film by using a Wire-grid polarizer manufactured by Moxtek, Co., Ltd. for 5 sec, so that the alignment was provided to form the alignment film.

Next, the solid in which 95.0% by weight of cyanobiphenyl acrylate that was polymerizable by UV and 5.0% by weight of Irgacure 907 (manufactured by Ciba-Geigy, Co., Ltd. in Switzerland) as the photoinitiator were mixed with each other was dissolved in toluene so that the content of the liquid crystal was 25 parts by weight based on 100 parts by weight of the liquid crystal solution to prepare the polymerizable reactive liquid crystal solution.

The prepared liquid crystal solution was applied on the photo-alignment film that was formed by using a roll coating process so that the thickness of the film after the drying was 1 µm, and the drying was performed at 80° C. for 2 min to align the molecules of the liquid crystal. The nonpolarized UV was radiated on the aligned liquid crystal film by using a high-pressure mercury lamp having the intensity of 200 mW/cm2 as a light source to fix the alignment state of the liquid crystal, thereby manufacturing the retardation film.

The alignment properties in respects to the manufactured retardation film were compared to each other by measuring the light leakage between the polarizing plates by the transmittance, and the quantitative retardation value was measured by using Axoscan (manufactured by Axomatrix, Co., Ltd.).

Comparative Example 2

Preparation of the Alignment Film Using the (endo-rich)5-norbornene-2-methyl-(4-methoxy cinnamate) Polymer The alignment film was prepared by using the same process as Preparation Example 1, except that (endo-rich)5-norbornene-2-methyl-(4-methoxy cinnamate) of Comparative Example 1 was used instead of the (exo-rich)5-norbornene-2-methyl-(4-methoxy cinnamate) polymer which is the polymer prepared in Example 1.

Experimental Example 1

Photoreactive Property Evaluation FT-IR Spectrum

In order to obtain the photoreactive property of the alignment film, the FT-IR spectrum of each of the liquid crystal alignment films that were obtained in Preparation Example 1 and Preparation Example 2 was observed, and the photoreactive properties were compared to each other based on the time ($t_{1/2}$) required until the intensity of the stretching mode of the C=C bond of the Formulae 1a to 1e of the polymer during the exposure (the mercury lamp having the intensity of 20 mW/cm$^2$ was used) was reduced by half and the energy value ($E_{1/2}$=20 mW/cm$^2$, t½). The results are described in the following Table 1. From the comparison of $t_{1/2}$ values, it could be seen that in the case of Preparation Example 1, the time was reduced by about 1.5 times as long as the case of Comparative Example 2 and the liquid crystal alignment film according to the present invention had the desirable photoreactive rate.

TABLE 1

| | $T_{1/2}$ (min) | $E_{1/2}$ (J/cm$^2$) |
|---|---|---|
| Preparation Example 1 | 0.9 | 1.0 |
| Comparative Example 1 | 1.5 | 1.8 |

The invention claimed is:

1. A norbornene polymer comprising norbornene monomers having a photoreactive functional group wherein said norbornene monomers contain at least 50 mol % of exo isomers, and the norbornene monomers are a compound represented by the following Formula 1:

[Formula 1]

in Formula 1,
p is an integer in the range of 0 to 4,
at least one of $R_1$, $R_2$, $R_3$, and $R_4$ is a radical that is selected from the group consisting of the following Formulae 1a, 1b, 1c, 1d and 1e, and the remains are each independently selected from the group consisting of hydrogen; halogen; substituted or unsubstituted C1-20 alkyl; substituted or unsubstituted C2-20 alkenyl; substituted or unsubstituted C5-12 cycloalkyl; substituted or unsubstituted C6-40 aryl; substituted or unsubstituted C7-15 aralkyl; substituted or unsubstituted C2-20 alkynyl; and a non-hydrocarbonaceous polar group that comprises one or more elements selected from the group consisting of oxygen, nitrogen, phosphorus, sulfur, silicon, and boron, if $R_1$, $R_2$, $R_3$, and $R_4$ are not hydrogen, halogen, or a polar functional group, $R_1$ and $R_2$, or $R_3$ and $R_4$ may be bonded to each other to form a C1-10 alkylidene group, or $R_1$ or $R_2$, may be bonded to any one of $R_3$ and $R_4$ to form a saturated or unsaturated C4-12 ring or an aromatic ring having 6 to 24 carbon atoms, the non-hydrocarbonaceous polar group is —OR$_6$, —R$_5$OR$_6$, —OC(O)OR$_6$, —R$_5$OC(O)OR$_6$, —C(O) OR$_6$, —R$_5$C(O)OR$_6$, —C(O)R$_6$, —R$_5$C(O)R$_6$, —OC (O)R$_6$, —R$_5$OC(O)R$_6$, —(R$_5$O)$_p$—OR$_6$ (p is an integer in the range of 1 to 10), —(OR$_5$)$_p$—OR$_6$ (p is an integer in the range of 1 to 10), —C(O)—O—C(O)R$_6$, —R$_5$C (O)—O—C(O)R$_6$, —SR$_6$, —R$_5$SR$_6$, —SSR$_6$, —R$_5$SSR$_6$, —S(=O)R$_6$, —R$_5$S(=O)R$_6$, —R$_5$C(=S) R$_6$, —R$_5$C(=S)SR$_6$, —R$_5$SO$_3$R$_6$, —SO$_3$R$_6$, —R$_5$N=C=S, —N=C=S, —NCO, —R$_5$—NCO, —CN, —R$_5$CN, —NNC(=S)R$_6$, —R$_5$NNC(=S)R$_6$, —NO$_2$, —R$_5$NO$_2$,

$R_5$ of each of the functional groups is substituted or unsubstituted C1-20 alkylene; substituted or unsubstituted C2-20 alkenylene; substituted or unsubstituted C5-12 cycloalkylene; substituted or unsubstituted C6-40 arylene; substituted or unsubstituted C7-15 aralkylene; or substituted or unsubstituted C2-20 alkynylene,

$R_6$, $R_7$ and $R_8$ are each independently hydrogen; halogen; substituted or unsubstituted C1-20 alkyl; substituted or unsubstituted C2-20 alkenyl; substituted or unsubstituted C5-12 cycloalkyl; substituted or unsubstituted C6-40 aryl; substituted or unsubstituted C7-15 aralkyl; or substituted or unsubstituted C2-20 alkynyl,

[Formula 1a]

[Formula 1b]

[Formula 1c]

[Formula 1d]

[Formula 1e]

in Formulae 1a, 1b, 1c, 1d and 1e,

A and A' are substituted or unsubstituted C1-20 alkylene, carbonyl, carboxy, substituted or unsubstituted C6-40 arylene, or a simple bond;

B is oxygen, sulfur, —NH—, or a simple bond;

X is oxygen or sulfur;

$R_9$ is a simple bond, substituted or unsubstituted C1-20 alkylene; substituted or unsubstituted C2-20 alkenylene; substituted or unsubstituted C5-12 cycloalkylene; substituted or unsubstituted C6-40 arylene; substituted or unsubstituted C7-15 aralkylene; or substituted or unsubstituted C2-20 alkynylene;

in Formula 1a, $R_{10}$ is C6-40 aryl; or C6-40 hetero aryl that comprises Group 14, 15 or 16 hetero elements, and aryl or hetero aryl is substituted with substituted or unsubstituted C1-20 alkoxy or substituted or unsubstituted C6-30 aryloxy;

in Formulae 1b and 1c, $R_{10}$, $R_{11}$, $R_{12}$, and $R_{13}$ are each independently selected from the group consisting of substituted or unsubstituted C1-20 alkyl; substituted or unsubstituted C1-20 alkoxy; substituted or unsubstituted C6-30 aryloxy; substituted or unsubstituted C6-40 aryl; C6-40 hetero aryl that comprises Group 14, 15 or 16 hetero elements; and substituted or unsubstituted C6-40 alkoxyaryl, $R_{14}$ is C6-40 aryl; or C6-40 hetero aryl that comprises Group 14, 15 or 16 hetero elements, and the aryl or hetero aryl is substituted with substituted or unsubstituted C1-20 alkoxy or substituted or unsubstituted C6-30 aryloxy;

in Formula 1d,

$R_{10}$ and $R_{14}$ are each independently are selected from the group consisting of substituted or unsubstituted C1-20 alkyl; substituted or unsubstituted C1-20 alkoxy; substituted or unsubstituted C6-30 aryloxy; substituted or unsubstituted C6-40 aryl; C6-40 hetero aryl that comprises Group 14, 15 or 16 hetero elements; and substituted or unsubstituted C6-40 alkoxyaryl, at least one of $R_{11}$, $R_{12}$, and $R_{13}$ is C6-40 aryl; or C6-40 hetero aryl that comprises Group 14, 15 or 16 hetero elements, and the aryl or hetero aryl is substituted with substituted or unsubstituted C1-20 alkoxy or substituted or unsubstituted C6-30 aryloxy; and in Formula 1e, at least one of $R_{10}$ and $R_{11}$, is C6-40 aryl; or C6-40 hetero aryl that comprises Group 14, 15 or 16 hetero elements, and the aryl or the hetero aryl is substituted with substituted or unsubstituted C1-20 alkoxy or substituted or unsubstituted C6-30 aryloxy; and the remains are selected from the group consisting of hydrogen, substituted or unsubstituted C1-20 alkyl; substituted or unsubstituted C1-20 alkoxy; substituted or unsubstituted C6-30 aryloxy; and substituted or unsubstituted C6-40 alkoxyaryl.

2. The norbornene polymer as set forth in claim 1, wherein among the substituent groups represented by Formulae 1a, 1b, 1c, 1d and 1e, C6-40 aryl or C6-40 hetero aryl that comprises Group 14, 15 or 16 hetero elements is any one selected from the group consisting of the compounds represented by the following Formulae:

-continued in the above Formulae, at least one of R'$_{10}$, R'$_{11}$, R'$_{12}$, R'$_{13}$, R'$_{14}$, R'$_{15}$, R'$_{16}$, R'$_{17}$, and R'$_{18}$ is necessarily substituted or unsubstituted C1-20 alkoxy or substituted or unsubstituted C6-30 aryloxy, and the remains are each independently selected from the group consisting of hydrogen, substituted or unsubstituted C1-20 alkyl, substituted or unsubstituted C1-20 alkoxy, substituted or unsubstituted C6-30 aryloxy, and substituted or unsubstituted C6-40 aryl.

3. The norbornene polymer as set forth in claim 1, comprising a repeating unit that is represented by the following Formula 3:

[Formula 3]

wherein n is in the range of 50 to 5,000, and p, R$_1$, R$_2$, R$_3$, and R$_4$ are the same as those defined in Formula 1.

4. The norbornene polymer as set forth in claim 1, wherein the norbornene polymer is a homopolymer of the exo-rich norbornene monomer having the photoreactive group.

5. The norbornene polymer as set forth in claim 1, wherein the norbornene polymer is a copolymer of the exo-rich norbornene monomers having the different photoreactive groups.

6. The norbornene polymer as set forth in claim 1, wherein the norbornene polymer is a copolymer of the exo-rich norbornene monomer having the photoreactive group and the norbornene monomer having no photoreactive group.

7. The norbornene polymer as set forth in claim 6, wherein the norbornene monomer having no photoreactive group is a compound that is represented by the following Formula 4:

[Formula 4]

wherein,
p' is an integer in the range of 0 to 4,
R'$_1$, R'$_2$, R'$_3$, and R'$_4$ are each independently selected from the group consisting of hydrogen; halogen; substituted or unsubstituted C1-20 alkyl, substituted or unsubstituted C2-20 alkenyl; substituted or unsubstituted C5-12 cycloalkyl; substituted or unsubstituted C6-40 aryl; substituted or unsubstituted C7-15 aralkyl; substituted or unsubstituted C2-20 alkynyl; and a non-hydrocarbonaceous polar group that comprises one or more elements selected from the group consisting of oxygen, nitrogen, phosphorus, sulfur, silicon, and boron,
if R'$_1$, R'$_2$, R'$_3$, and R'$_4$ are not hydrogen, halogen, or a polar functional group, R'$_1$, and R'$_2$, or R'$_3$ and R'$_4$ may be bonded to each other to form a C1-10 alkylidene group, or R'$_1$, or R'$_2$ may be bonded to any one of R'$_3$ and R'$_4$ to form a saturated or unsaturated C4-12 ring or an aromatic ring having 6 to 24 carbon atoms,
the non-hydrocarbonaceous polar group is —OR$_6$, —OC(O)OR$_6$, —R$_5$OR$_6$, —R$_5$OC(O)OR$_6$, —C(O)OR$_6$, —R$_5$C(O)OR$_6$, —C(O)R$_6$, —R$_5$C(O)R$_6$, —OC(O)R$_6$, —R$_5$OC(O)R$_6$, —(R$_5$O)$_p$—OR$_6$ (p is an integer in the range of 1 to 10), —(OR$_5$)$_p$—OR$_6$ (p is an integer in the range of 1 to 10), —C(O)—O—C(O)R$_6$, —R$_5$C(O)—O—C(O)R$_6$, —SR$_6$, —R$_5$SR$_6$, —SSR$_6$, —R$_5$SSR$_6$, —S(=O)R$_6$, —R$_5$S(=O)R$_6$, —R$_5$C(=S)R$_6$, —R$_5$C(=S)SR$_6$, —R$_5$SO$_3$R$_6$, —SO$_3$R$_6$, —R$_5$N=C=S, —N=C=S, —NCO, —R$_5$—NCO, —CN, —R$_5$CN, —NNC(=S)R$_6$, —R$_5$NNC(=S)R$_6$, —NO$_2$, —R$_5$NO$_2$, R$_5$ of each of the functional groups is substituted or unsubstituted C1-20 alkylene; substituted or unsubstituted C2-20 alkenylene; substituted or unsubstituted C5-12 cycloalkylene; substituted or unsubstituted C6-40 arylene; substituted or unsubstituted C7-15 aralkylene; or substituted or unsubstituted C2-20 alkynylene, and R$_6$, R$_7$ and R$_8$ are each hydrogen; halogen; substituted or unsubstituted C1-20 alkyl; substituted or unsubstituted C2-20 alkenyl; substituted or unsubstituted C5-12 cycloalkyl; substituted or unsubstituted C6-40 aryl; substituted or unsubstituted C7-15 aralkyl; or substituted or unsubstituted C2-20 alkynyl.

8. A method of manufacturing the norbornene polymer according to claim 1, the method comprising:
polymerizing photoreactive norbornene monomers having at least 50 mol % of exo isomers at a temperature in the range of 10 to 200° C. in the presence of a catalyst mixture consisting of a procatalyst that comprises a Group 10 transition metal, a first cocatalyst that provides a Lewis base capable of being weakly coordinate bonded to the metal of the procatalyst, and selectively a second cocatalyst that provides a compound comprising a neutral Group 15 electron donating ligand.

9. The method of manufacturing the norbornene polymer as set forth in claim 8, wherein the catalyst mixture comprises 1 to 1000 mole of the first cocatalyst and selectively 1 to 1000 mole of the second cocatalyst based on 1 mole of the procatalyst.

* * * * *